(12) United States Patent
Viering et al.

(10) Patent No.: US 12,177,698 B2
(45) Date of Patent: Dec. 24, 2024

(54) RRC RECONFIGURATIONS DURING CONDITIONAL HANDOVER

(71) Applicant: NOKIA TECHNOLOGIES OY, Espoo (FI)

(72) Inventors: Ingo Viering, Munich (DE); Krzysztof Kordybach, Pulawy (PL); Tero Henttonen, Espoo (FI); Ahmad Awada, Munich (DE); Guillaume Decarreau, Munich (DE); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 333 days.

(21) Appl. No.: 17/619,782

(22) PCT Filed: Jun. 27, 2019

(86) PCT No.: PCT/EP2019/067103
§ 371 (c)(1),
(2) Date: Dec. 16, 2021

(87) PCT Pub. No.: WO2020/259836
PCT Pub. Date: Dec. 30, 2020

(65) Prior Publication Data
US 2022/0303844 A1    Sep. 22, 2022

(51) Int. Cl.
*H04W 24/08* (2009.01)
*H04W 36/00* (2009.01)
*H04W 36/36* (2009.01)

(52) U.S. Cl.
CPC ....... *H04W 24/08* (2013.01); *H04W 36/0016* (2013.01); *H04W 36/0061* (2013.01); *H04W 36/362* (2023.05); *H04W 36/0072* (2013.01)

(58) Field of Classification Search
CPC .............................................. H04W 36/00837
See application file for complete search history.

(56) References Cited

U.S. PATENT DOCUMENTS

| 2014/0146732 | A1 | 5/2014 | Olufunmilola et al. |
| 2020/0351734 | A1* | 11/2020 | Purkayastha ......... H04W 76/30 |
| 2020/0396652 | A1* | 12/2020 | Decarreau ......... H04W 36/0033 |

FOREIGN PATENT DOCUMENTS

| CN | 102318395 A | 1/2012 |
| CN | 108632926 A | 10/2018 |

(Continued)

OTHER PUBLICATIONS

Henrik Martikainen et al., "On the Basics of Conditional Handover for 5G Mobility," 2018 IEEE 29th Annual International Symposium on Personal, Indoor, and Mobile Radio Communications (PIMRC), Bologna, Italy, Sep. 2018.

(Continued)

*Primary Examiner* — Abdeltif Ajid
(74) *Attorney, Agent, or Firm* — Robert P. Michal, Esq.; Carter, DeLuca & Farrell LLP

(57) ABSTRACT

It is provided a method comprising monitoring if a source cell intends performing a radio reconfiguration of a terminal configured with a conditional handover from the source cell to a target cell; determining a determined category among plural predetermined categories; wherein the radio reconfiguration is associated to the determined category; for each category a respective predetermined sequence of one or more operations is defined; the respective predetermined of one of the categories is different from the respective predetermined sequence of another one of the categories; and the method further comprises inhibiting the performing of the radio reconfiguration of the terminal unless the predetermined sequence of one or more operations of the determined category is performed along with the performing of the radio (Continued)

reconfiguration if the source cell intends performing the radio reconfiguration of the terminal.

1 Claim, 9 Drawing Sheets

(56) References Cited

FOREIGN PATENT DOCUMENTS

| JP | 2017143565 A | 8/2017 | |
|---|---|---|---|
| WO | 2013/113357 A1 | 8/2013 | |
| WO | WO 2018/132051 A1 | 7/2018 | |
| WO | 2018/172600 A1 | 9/2018 | |
| WO | WO 2019/096396 A1 | 5/2019 | |
| WO | WO-2020117118 A1 * | 6/2020 | ............ H04W 36/08 |

OTHER PUBLICATIONS

International Search Report and Written Opinion dated Sep. 24, 2020 corresponding to International Patent Application No. PCT/EP2020/068277.
Ericsson, "CHO Preparation—Summary of offline discussion,"—3GPP Draft; R3-201159, 3GPP TSG-RAN WG3 meeting #107-e, E-meeting, Mar. 8, 2020, XP051861490.
CATT, "Further Consideration on CHO preparation Procedure," 3GPP Draft; R3-200529, 3GPP TSG-RAN WG3 #107-3, Online, Feb. 15, 2020, XP051854527.
Nokia et al., "(TP for NR_Mob_enh BL CR for TS 38.423): Completion of the open points related to the modification of a CHO," 3GPP Draft; R3-201654, 3GPP TSG-RAN WG3 Meeting #107-bis-e, E-meeting, Apr. 9, 2020, XP051870479.
RAN3 Chairman, "List of E-mail Discussions", 3GPP Draft; R3-202552, 3GPP TSG-RAN WG3 #107bis-e, Online, May 4, 2020, XP051880757.
International Search Report and Written Opinion dated Mar. 31, 2020 corresponding to International Patent Application No. PCT/EP2019/067103.
Nokia et al., "Further details of Baseline Conditional Handover in E-UTRAN," 3GPP Draft; R2-1904286, 3GPP TSG-RAN WG2 Meeting #105bis, Xian, China, Mar. 28, 2019, XP051693508.
Nokia et al., "Configuration Management for Conditional Handover," 3GPP Draft, R2-1803347, 3GPP TSG-RAN WG2 Meeting #101, Athens, Greece, Feb. 16, 2018, XP051400479.
Qualcomm Incorporated, "LTE Conditional HO design considerations," 3GPP Draft; R2-1906375, 3GPP TSG-RAN WG2 Meeting #106, Reno, USA, May 13, 2019, XP051729840.
China Telecom et al., "New Work Item on even further Mobility enhancement in E-UTRAN," 3GPP Draft; RP-181337, 3GPP TSG RAN Meeting #80, La Jolla, CA, USA, Jun. 11-14, 2018.
Intel Corporation, "New WID: NR mobility enhancements," 3GPP Draft, RP-181433, 3GPP TSG RAN Meeting #80, La Jolla, CA, USA, May 21-25, 2018.
Msc-Generator, Sourceforge, Retrieved on May 13, 2024, Webpage available at : https://sourceforge.net/projects/msc-generator/.
"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423, V15.5.0, Mar. 2019, pp. 1-414.
"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.
"3rd Generation Partnership Project; Technical Specification Group Radio Access Network; NG-RAN; F1 application protocol (F1AP) (Release 15)", 3GPP TS 38.473, V15.5.0, Mar. 2019, pp. 1-198.
Notice of Allowance received for corresponding European Patent Application No. 19748668.1, dated Mar. 28, 2024, 8 pages.
Office Action received for corresponding Chinese Patent Application No. 201980097880.X, dated Apr. 19, 2024, 7 pages of Office Action and English translation, 5 pages, total 12 pages.
"LTE Conditional HO failure handling", 3GPP TSG-RAN WG2 Meeting #106, R2-1906662, Agenda item: 12.3.3.1, Qualcomm Incorporated, May 13-17, 2019, 4 pages.
"New Radio (NR) Access Technology", 3GPP TSG RAN meeting #76, RP-171137, Agenda item: 9.2.1, NTT DOCOMO, Inc., Jun. 5-8, 2017, pp. 1-218.
"3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 15)", 3GPP TS 36.523-1, V15.5.0, Mar. 2019, pp. 1-43.
"3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 12)", 3GPP TS 36.523-1, V12.2.0, Jun. 2014, pp. 1-25.

* cited by examiner

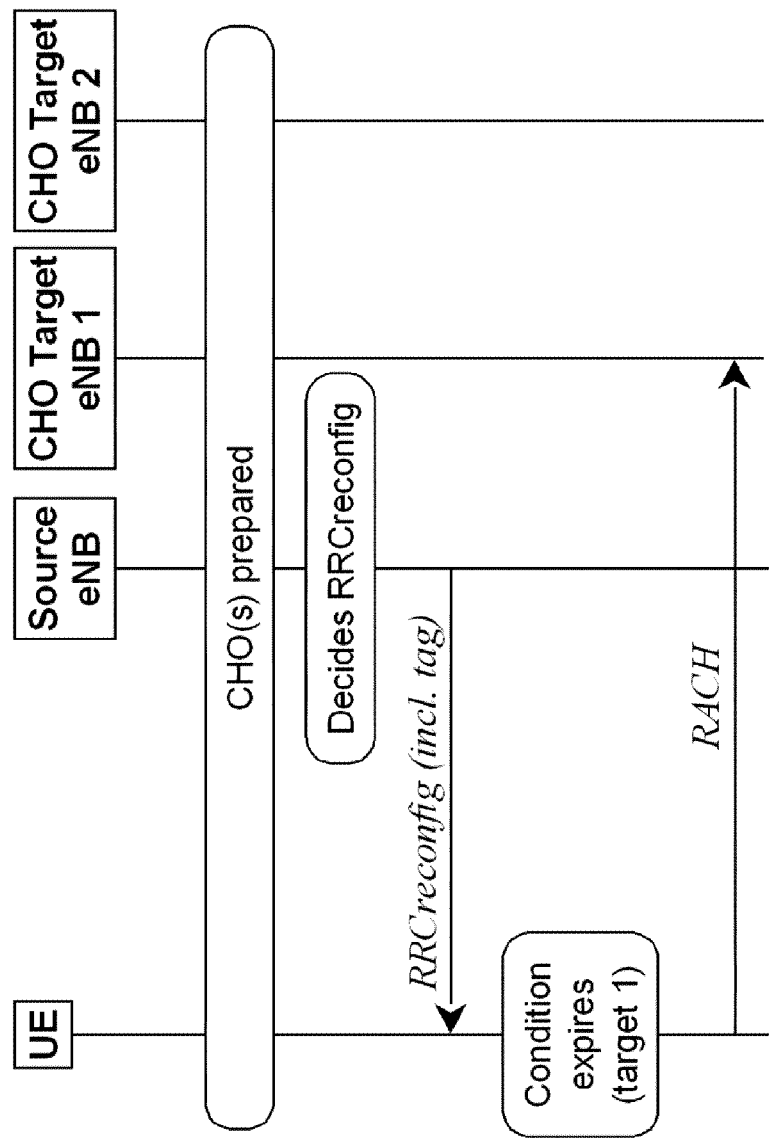

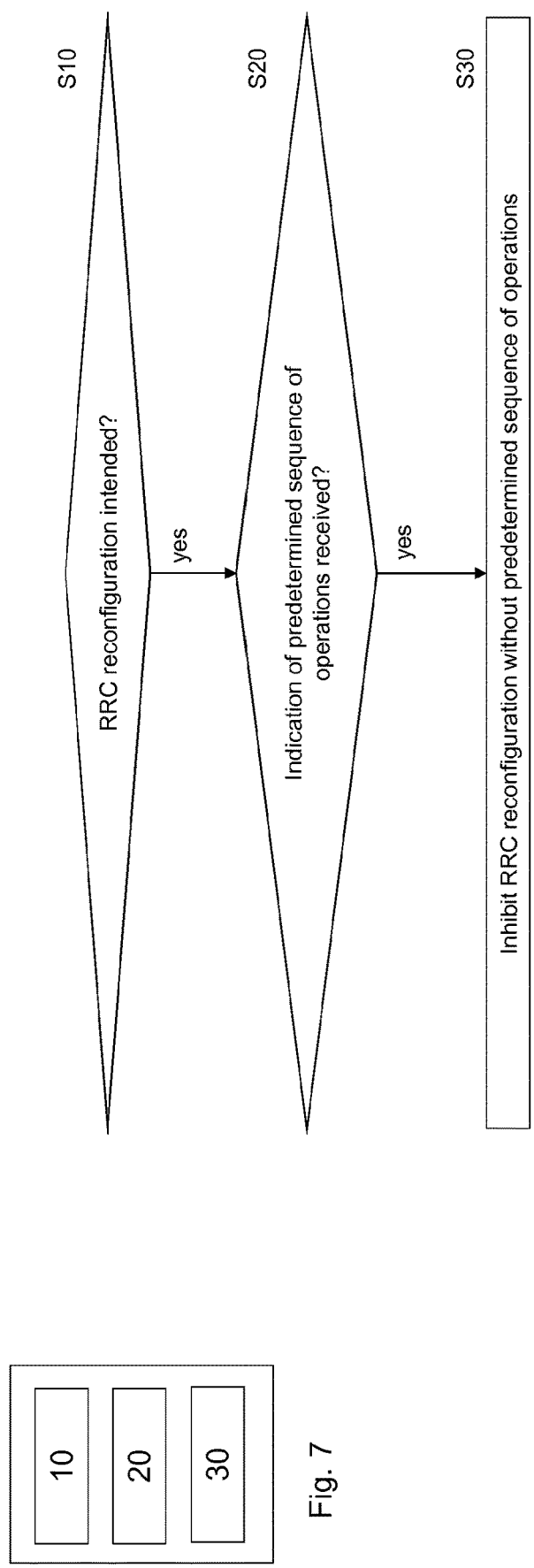

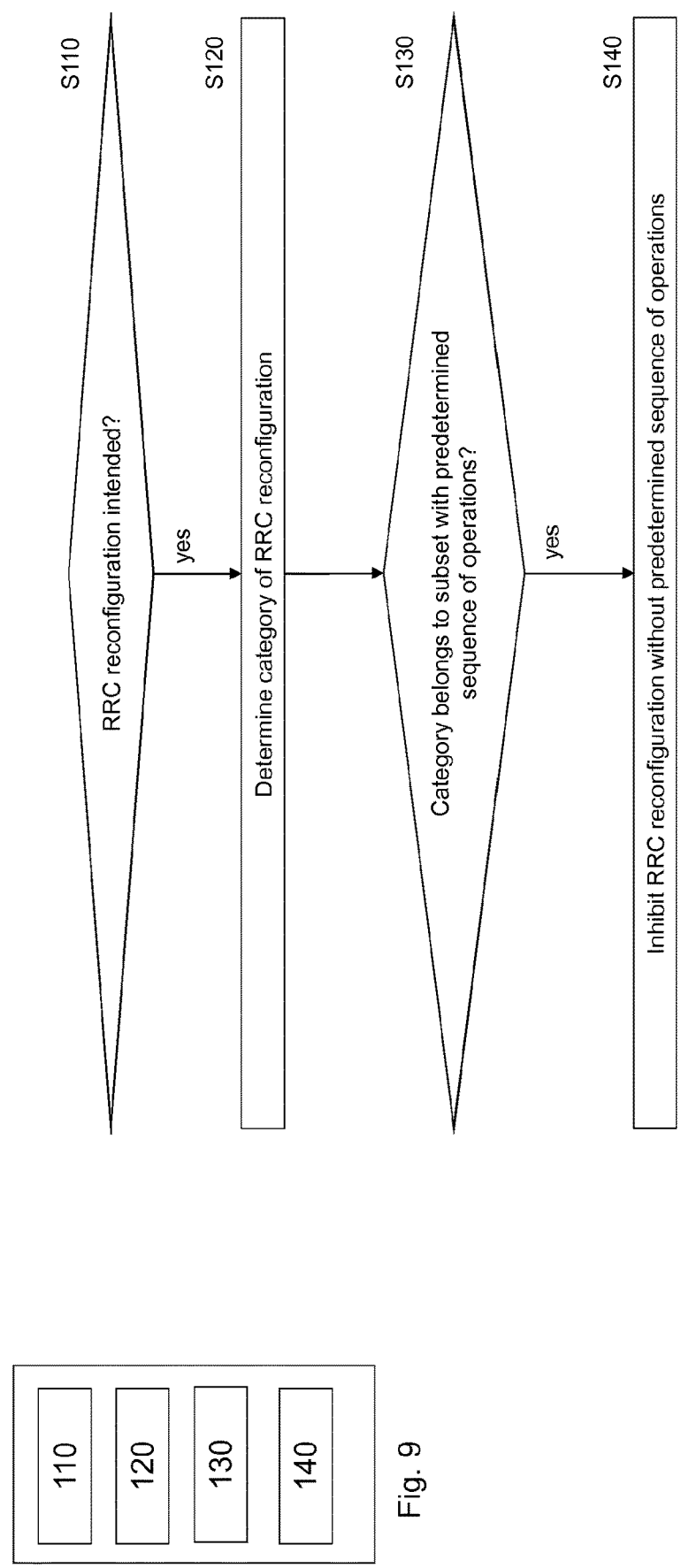

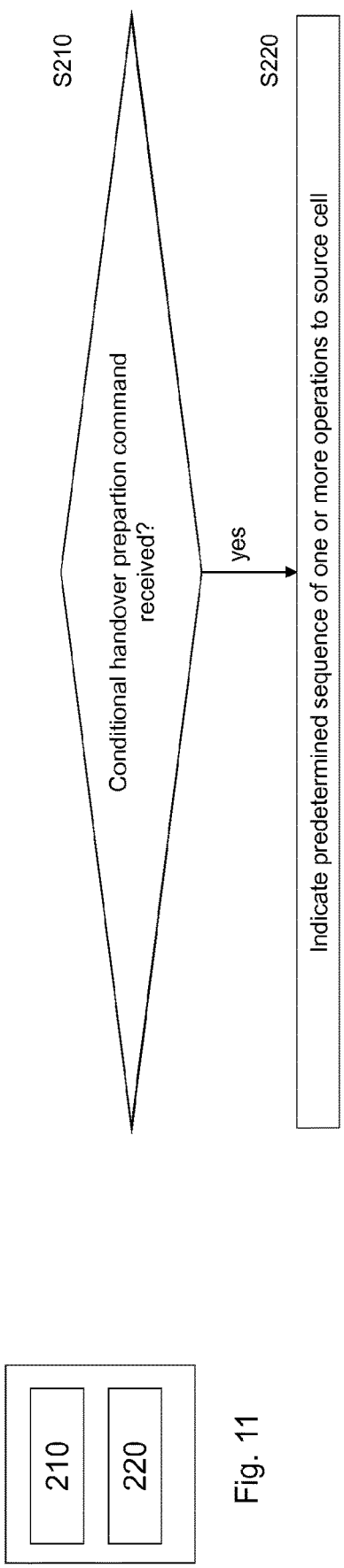

RRC RECONFIGURATIONS DURING CONDITIONAL HANDOVER

FIELD OF THE INVENTION

The present invention relates to conditional handover. In particular, it relates to RRC reconfigurations during conditional handover, i.e. before the condition of the conditional handover is expired.

Abbreviations

3GPP 3rd Generation Partnership Project
3G/4G/5G 3rd/4th 5th Generation
ACK Acknowledge
AP Application Part
BS Base Station
CHO Conditional Handover
DRB Data Radio Bearer
eMBB evolved Mobile Broadband
EN-DC E-UTRA NR Dual Connectivity
E-UTRA Evolved-Universal Terrestrial Radio Access
HO Handover
LTE Long Term Evolution
MIMO Multiple Input-Multiple Output
MTC Machine Type Communication
NR New Radio
OAM Operations and Management
RACH Random Access Channel
RF Radio Frequency
RRC Radio Resource Control
RRM Radio Resource Management
UE User Equipment

BACKGROUND OF THE INVENTION

"Conditional Handover" (CHO) is currently being discussed for improving the mobility robustness in two work items for mobility enhancements in LTE [1] and NR [2].

The CHO is similar to the legacy handover, and a message sequence chart for CHO is shown in FIG. 1. The first steps ("Phase 1") are identical to the legacy handover. A configured event triggers the UE to send a measurement report. Based on this report, the source cell typically prepares the target cell (or multiple candidate target cells) for the handover (Handover Request+Handover Request Acknowledgement). Then, the source cell sends a (conditional) handover command to the UE. However, note that it is up to the network when to decide to use CHO: It is entirely possible that network chooses to configure UE with CHO command even without any measurement reports, e.g. in cases where the deployments are uniform.

For the legacy HO, the UE immediately accesses the target cell to complete the handover. Instead, for CHO, the UE will only access the target cell once an additional CHO execution condition expires. The condition is typically configured, e.g. by the source cell during HO Command (details are still awaiting 3GPP decisions).

The advantage of the CHO compared to conventional (unconditional) HO is that the HO command can be sent very early, when the UE is still safe in the source cell, without risking the access into and the stability of the target cell. More details on the CHO can be found in e.g. [3].

The HO Command is generated by the target cell and included into the "Handover Request Acknowledgement" sent from target cell to source cell. The source cell then packages the HO command to RRC message and sends it to the UE via RRC signalling. 3GPP RAN2 has agreed that CHO can be configured for multiple target cells at the same time, i.e. there might be multiple target cells configured as CHO command for a UE at the same time ("prepared cell list" in FIG. 1).

The UE stays in the source cell for an uncertain period of time until the CHO condition expires, after the CHO for a certain candidate target cell has been configured in phase 1. During this uncertain period (i.e. when UE is configured with CHO but has not yet executed any CHO command; that is, between phase 1 and phase 2 in FIG. 1), it may happen that the source cell has to reconfigure the UE, e.g. to change RRC radio parameters, modify the radio bearers or configure CHO to other target cells. 3GPP RAN2 has agreed that the source cell remains responsible for RRC configuration, so the source cell is allowed to reconfigure the UE as long as the UE does not complete the HO into the target cell (i.e. RRC Connection Reconfiguration Complete message in case of E-UTRAN).

However, any CHO target cell only knows the UE configuration that it agreed to handle when the CHO was initially triggered. A later (intermediate between the triggering of CHO and handover execution) RRC reconfiguration may lead to inconsistencies during the execution of the handover, since the UE may have a different RRC configuration than that assumed by the target cell. There is a case where such intermediate reconfiguration does not cause any problems: if the CHO uses full configuration (which is an RRC option where the entire UE RRC context is first cleared and then (re)configured from scratch). However, a lot of signalling is required in this case.

The following solutions have already been mentioned in 3GPP contributions:

Prior Art Solution 1: Cancel and Re-Initiate CHO

The most straight forward solution is that the source cell first cancels the CHO and then re-initiates it again (after RRC reconfiguration, as shown in FIG. 2). This makes sure that the UE and the target cell have consistent RRC configurations whenever the UE executes the handover. This is the safest method from the configuration consistency point of view.

Obviously, this is also the most signalling-intensive solution, in particular when considering multiple targets. In addition, it may delay the execution of a CHO which may lead to connection failures.

Prior Art Solution 2: Agree RRC Reconfiguration with Target Cell PRIOR to Reconfiguration Cancelling the CHO as according to prior art solution 1 may not be necessary. Instead, prior to reconfiguring the UE, the source cell can send the desired reconfiguration to the target cell (as shown in FIG. 3). When the source cell receives an acknowledgement from the target cell, it can reconfigure the UE. This can probably be realized by a conventional HO Request/HO Request Acknowledgement procedure, as already proposed in [4] and a corresponding 3GPP contribution [5].

In prior art solution 2, there is the risk that the UE executes the CHO before it has received the 'new' RRC reconfiguration, but after the target cell(s) have already agreed to this RRC reconfiguration. [5] proposes a solution for resolving this inconsistency:

The target cell provides a tag for a requested RRC reconfiguration
The target cell also stores the old RRC configuration
The UE adds this tag to the first Random Access message From this tag, the target cell can read whether the UE has properly received the new RRC reconfiguration, or whether it has to apply the old (stored) RRC configuration.

However, this procedure is also rather complex for both UE and network, in particular when considering multiple targets. Furthermore, it delays the completion of RRC reconfiguration procedure which might be harmful in some cases and may limit the usage of CHO.

Prior Art Solution 3: Source Cell Informs the Target Cell about the RRC Reconfiguration With this option, the source cell sends the RRC reconfiguration to the UE, and afterwards informs the target cell about this RRC reconfiguration (as shown in FIG. 4). This avoids the delayed reconfiguration and is less complex. However, this does not solve all the inconsistencies:

The UE may access the target cell before the target cell has received the information from the source cell. This is not very likely due to the UE having to decode the RRC reconfiguration, sync to the target cell, retune the RF, wait for a RACH opportunity, send RACH, BS has to detect and send reply, etc. This will take >30-40 ms which in most cases should leave enough time to inform the target cell but the risk is still there (which may require some handling, preferably to be specified in 3GPP, further complicating the CHO solution).

It may happen that the target cell does not want, or is simply not able to accept the RRC reconfiguration. For instance, the target cell may not support certain types of bearer, or did not reserve enough resources for the type of bearer. In such cases, target cell might cancel the CHO when receiving the indication. When UE executes the CHO when target cell has just canceled the CHO (i.e. before the UE was reconfigured), another error may occur (CHO to target cell although target cell is not prepared).

Similar to prior art solution 2, the source cell may tag the RRC reconfigurations. When the UE provides this tag during random access, the target cell is aware of an inconsistency, but this still does not avoid a potential call drop, if e.g. the target cell does not support the bearer type.

Prior Art Solution 4: Synchronize RRC Reconfiguration after Random Access

It was proposed to synchronize the RRC configuration only late during the HO process, i.e. after UE performs Random Access (as shown in FIG. 5). Some companies proposed to do late synchronization in general for CHO, but it may also be done only when the inconsistencies have occurred. As described above for prior art solutions 2 and 3, the inconsistencies can (at least in theory) be detected by tagging the RRC reconfigurations.

However, prior art solution 4 delays the random access, requires modifications to the information conveyed by RACH, and causes quite some effort for both UE and network. More severely, it does not help if the target cell does not support the reconfiguration which the source cell has done.

Prior Art Solution 5: RRC Reconfiguration without Notifying the Target Cell

The source cell may also do the RRC reconfiguration without informing the target cell at all (as shown in FIG. 6). Obviously, this does not solve the problem (and can even make the problem harder to tackle).

REFERENCES

[1] RP-181337, New Work Item on even further Mobility enhancement in E-UTRAN, 3GPP TSG RAN Meeting #80, La Jolla, CA, USA, 11-14 Jun. 2018.

[2] RP-181433, New WID: NR mobility enhancements, 3GPP TSG RAN Meeting #80, La Jolla, USA, May 21-May 25, 2018.

[3] H. Martikainen, I. Viering, A. Lobinger, T. Jokela, "On the Basics of Conditional Handover for 5G Mobility," *IEEE International Symposium on Personal, Indoor and Mobile Radio Communications (PIMRC)* 2018, Bologna, Italy, September 2018.

[4] WO 2019/096396: UE CONTEXT INFORMATION FOR CONDITIONAL HANDOVER, 13.10.2017

[5] R2-1803347, Configuration Management for Conditional Handover, Athens, Greece, 26 Feb.-2 Mar. 2018.

SUMMARY OF THE INVENTION

It is an object of the present invention to improve the prior art.

According to a first aspect of the invention, there is provided an apparatus, comprising means for monitoring configured to monitor if a source cell intends performing a radio reconfiguration of a terminal configured with a conditional handover from the source cell to a target cell; means for determining configured to determine a determined category among plural predetermined categories; wherein the radio reconfiguration is associated to the determined category; for each category of at least a subset of the plural predetermined categories, it is defined a respective predetermined sequence of one or more operations; at least one of: the respective predetermined sequence of one or more operations of one of the categories of the subset is different from the respective predetermined sequence of one or more operations of another one of the categories of the subset, and at least one of the plural predetermined categories does not belong to the subset such that a respective predetermined sequence of one or more operations is not defined for this at least one category; and the apparatus further comprises means for deciding configured to decide if the determined category is one of the subset; means for inhibiting configured to inhibit the performing of the radio reconfiguration of the terminal unless the predetermined sequence of one or more operations of the determined category is performed along with the performing of the radio reconfiguration if the determined category is one of the subset and if the source cell intends performing the radio reconfiguration of the terminal.

According to a second aspect of the invention, there is provided an apparatus, comprising means for monitoring configured to monitor if a source cell intends performing a radio reconfiguration of a terminal configured with a conditional handover from the source cell to a target cell; means for checking configured to check if an indication of a predetermined sequence of one or more operations to be performed along with the performing of the radio reconfiguration of the terminal is received from the target cell; means for inhibiting configured to inhibit the performing of the radio reconfiguration of the terminal unless the predetermined sequence of one or more operations is performed along with the performing of the radio reconfiguration if the indication is received from the target cell and if the radio reconfiguration of the terminal is intended.

According to a third aspect of the invention, there is provided an apparatus, comprising means for monitoring configured to monitor if a target cell receives a conditional handover preparation command for a conditional handover of a terminal from a source cell to the target cell; means for indicating configured to indicate, to the source cell, a predetermined sequence of one or more operations to be performed along with performing a potential radio reconfiguration of the terminal if the conditional handover preparation command is received.

According to a fourth aspect of the invention, there is provided a method, comprising monitoring if a source cell intends performing a radio reconfiguration of a terminal configured with a conditional handover from the source cell to a target cell; determining a determined category among plural predetermined categories; wherein the radio reconfiguration is associated to the determined category; for each category of at least a subset of the plural predetermined categories, it is defined a respective predetermined sequence of one or more operations; at least one of: the respective predetermined sequence of one or more operations of one of the categories of the subset is different from the respective predetermined sequence of one or more operations of another one of the categories of the subset, and at least one of the plural predetermined categories does not belong to the subset such that a respective predetermined sequence of one or more operations is not defined for this at least one category; and the method further comprises deciding if the determined category is one of the subset; inhibiting the performing of the radio reconfiguration of the terminal unless the predetermined sequence of one or more operations of the determined category is performed along with the performing of the radio reconfiguration if the determined category is one of the subset and if the source cell intends performing the radio reconfiguration of the terminal.

According to a fifth aspect of the invention, there is provided a method, comprising monitoring if a source cell intends performing a radio reconfiguration of a terminal configured with a conditional handover from the source cell to a target cell; checking if an indication of a predetermined sequence of one or more operations to be performed along with the performing of the radio reconfiguration of the terminal is received from the target cell; inhibiting the performing of the radio reconfiguration of the terminal unless the predetermined sequence of one or more operations is performed along with the performing of the radio reconfiguration if the indication is received from the target cell and if the radio reconfiguration of the terminal is intended.

According to a sixth aspect of the invention, there is provided a method, comprising monitoring if a target cell receives a conditional handover preparation command for a conditional handover of a terminal from a source cell to the target cell; indicating, to the source cell, a predetermined sequence of one or more operations to be performed along with performing a potential radio reconfiguration of the terminal if the conditional handover preparation command is received.

Each of the methods of the fourth to sixth aspects may be a method of conditional handover.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
RRC inconsistencies may be avoided such that call drops due to such inconsistencies are excluded;
Signaling and/or delay may be minimized;
Categorization may be made according to the needs, in particular to the needs of the target cell.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 6 depicts Solution 5 of the prior art;

FIG. 7 shows an apparatus according to an example embodiment of the invention;

FIG. 8 shows a method according to an example embodiment of the invention;

FIG. 9 shows an apparatus according to an example embodiment of the invention;

FIG. 10 shows a method according to an example embodiment of the invention;

FIG. 11 shows an apparatus according to an example embodiment of the invention;

FIG. 12 shows a method according to an example embodiment of the invention; and FIG. 13 shows an apparatus according to an example embodiment of the invention.

DETAILED DESCRIPTION OF CERTAIN EMBODIMENTS

Figure 1:
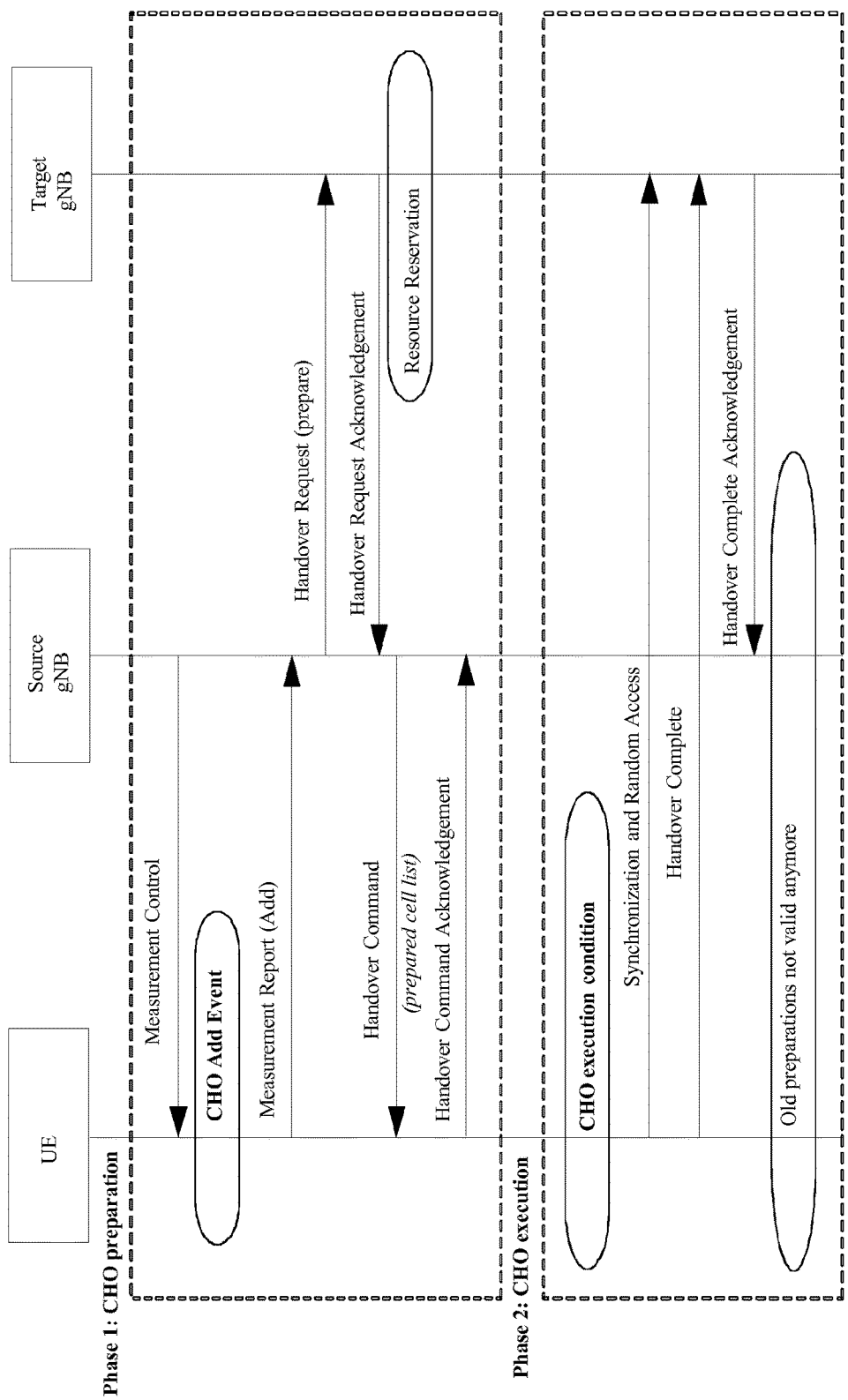
FIG. 1 depicts conditional handover according to the prior art.
Figure 2:
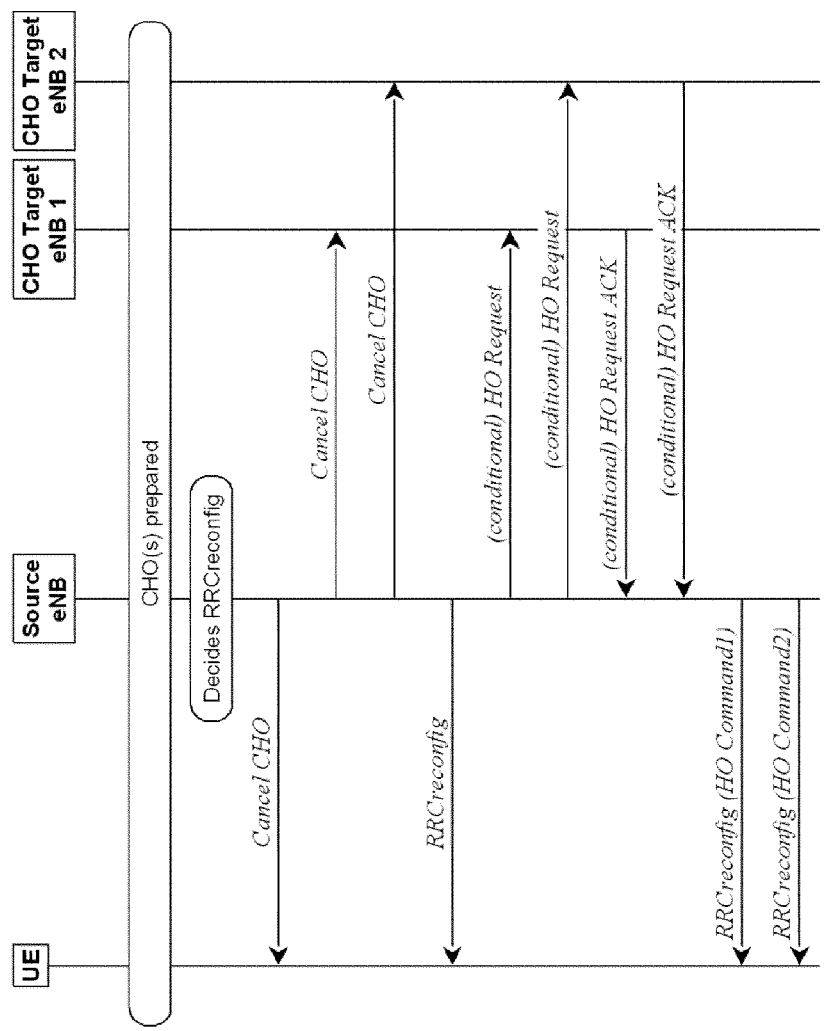
FIG. 2 depicts Solution 1 of the prior art.
Figure 3:
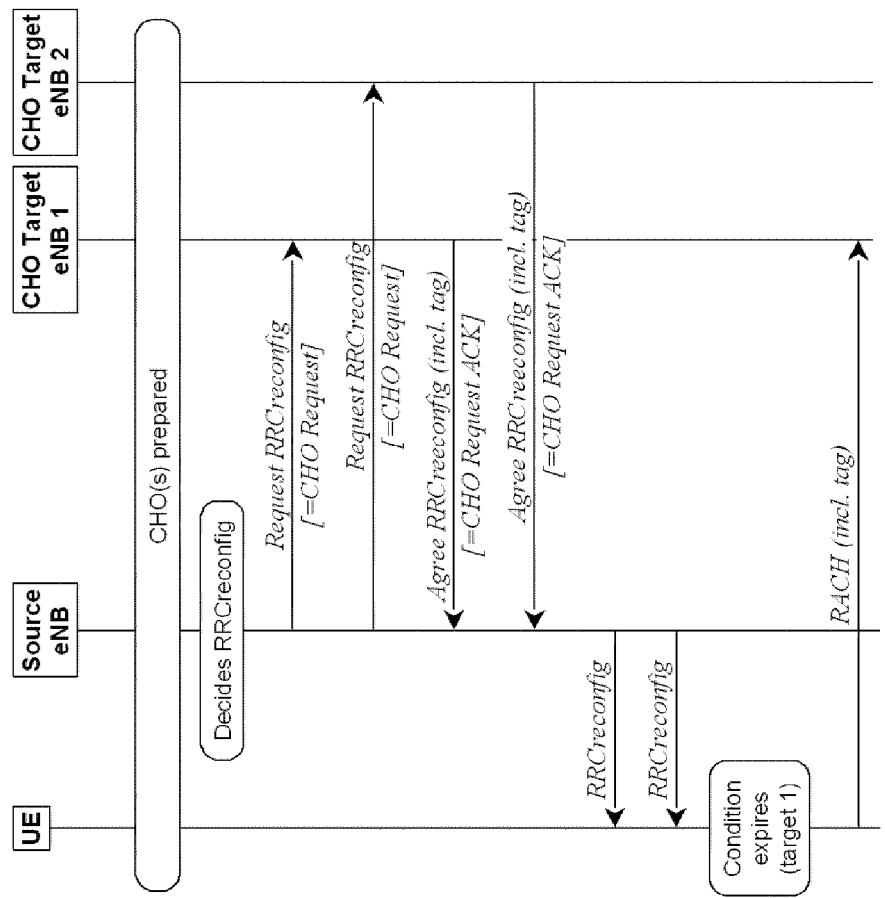
FIG. 3 depicts Solution 2 of the prior art.
Figure 4:
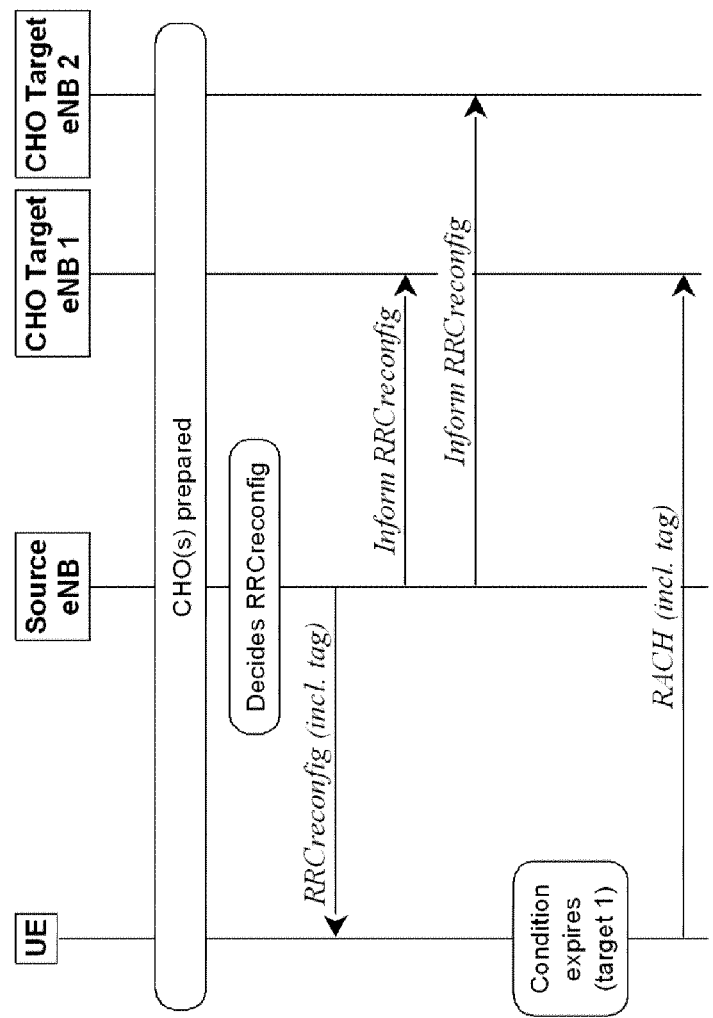
FIG. 4 depicts Solution 3 of the prior art.
Figure 5:
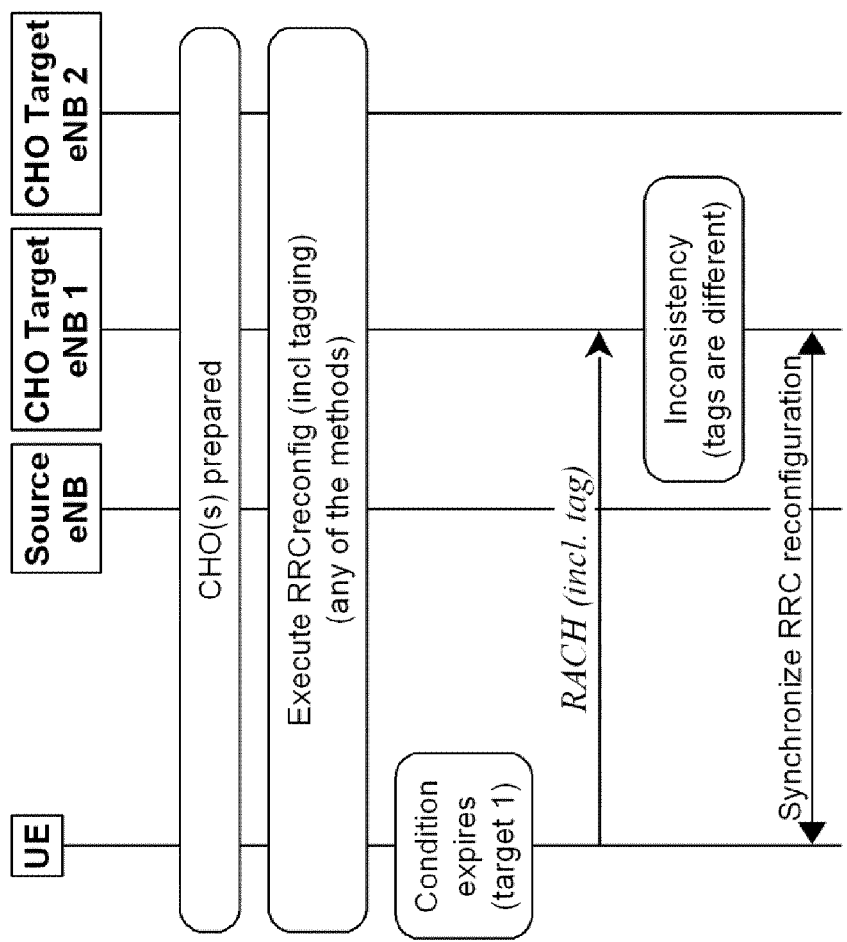
FIG. 5 depicts Solution 4 of the prior art.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

It is observed that for some types of RRC reconfiguration, prior art solution 5 (RRC reconfiguration without notifying the target cell) does not cause immediate problems, but only creates a configuration mismatch between UE and network that could but need not necessarily lead to unexpected UE behaviour.

Based on this observation, according to some example embodiments of the invention, the RRC reconfigurations are categorized into different groups that may be handled differently by the network. Some example categorizations are shown below (other categorizations are not precluded):

1. RRC reconfigurations which do not affect the target cell at all. In this case, the source cell can perform the RRC re-configuration without involving the target cell. (For example, source cell could have configured "feature X" that target cell then releases in the CHO command, so any reconfigurations affecting the RRC parameters of "feature X" would be irrelevant)

2. RRC reconfigurations that need to be known by the target cell (either before or after configuring them). In this case, the source cell notifies the target cell about the executed RRC re-configurations but does not need to wait for acknowledgement from target cell. (For example, source cell might do a one-shot configuration that affects UE behaviour only once during the reconfiguration procedure and the parameter is not stored afterwards, thus not affecting the UE RRC context.)
3. RRC reconfigurations that need to be accepted/acknowledged by the target cell. In this case, the source cell does not perform such RRC reconfiguration before agreeing with the target cell. (Most configurations dependent on UE capabilities fall under this category, e.g. configuring different number of MIMO layers per cell needs to be known by both source cell and target cell(s).)
4. RRC reconfigurations that immediately invalidate the stored CHO command. In this case, source cell releases the CHO command without waiting for acknowledgment from the target cell. (For example, the source cell may configure EN-DC for the UE, but OAM policies do not allow the target cell to use EN-DC. In such case, source cell shall completely re-initialize the CHO.)

This categorization of potential RRC reconfigurations may be done for the UE when the CHO is prepared (configured) for the UE. In some example embodiments, the categorization may be predefined (e.g. specified in a 3GPP standard) based on fixed criteria related to the CHO triggering. In some example embodiments, the categorization may be done autonomously by the source cell, e.g. based on its implementation.

This approach might result in that either the source cell indicates any RRC reconfiguration to the target cell prior to performing the RRC reconfiguration (as this would always be the safest option), or always cancelling the CHO configuration when doing changes (which carries some risk of CHO not being triggered although it never causes any real problems to the UE if it has regular HO measurement reporting configured so source cell can fall back to legacy HO procedures).

3GPP mandates that any changes of the bearer type have to be agreed with the target cell (i.e. follow solution #1 or #2), whereas all other RRC reconfigurations can be done with informing the target cell (solution #3) or not informing the target cell at all (solution #5).

In some example embodiments of the invention, the target cell provides the categorization in the (conditional) HO Request Acknowledgement via X2 or Xn interface (interface between source cell and target cell). The categorization provided by the target cell may be based on its internal (semi-static) situation (i.e. conditions that are not expected to change until the CHO is completed or is cancelled). Examples, how this categorization can be done, are provided further below.

Knowing this categorization and the intended RRC reconfiguration, the source cell selects one of the prior art solutions 1 to 5 and proceeds accordingly. For example, for each of the categories, the procedure (operations) which have to be performed by the source cell along with the RRC reconfiguration may be predefined (e.g. by a 3GPP standard), or may be indicated by the target cell to the source cell.

Some example embodiments are explained at greater detail. In these example embodiments, the target cell provides the categorization to the source cell.

Example Embodiment 1

Along with the HO Request ACK (which comprises an indication of the supported bearer configuration), the target cell may provide a list of additional bearer configurations to the source cell (i.e. not being currently configured to the UE in the source cell). The source cell starts an agreement procedure with the target cell (such as that of prior art solution 2) when changing the configuration to a bearer which is not part of the list. Otherwise, the source cell just informs the target cell on the new bearer configuration.

In another example embodiment, the source cell asks pro-actively for more "potential" bearer configurations than currently needed. E.g., when a UE has currently a voice call, but is likely to do eMBB soon, the source cell may already ask for a potential eMBB bearer in the HO Request. The aforementioned list could be a direct response to the request of "potential" bearers.

Example Embodiment 2

The target cell may provide a bitmap which has the same size as the content of the Handover Command (e.g. specifically a list of DRBs and/or radio parameters). Every bit may specify whether a potential change has to be agreed or not. Instead of a single bit, plural bits may be foreseen for every DRB and/or radio parameter in order to distinguish different operations to be performed along with the RRC configurations. E.g., with 2 bits, prior art solutions 1 to 4 may be distinguished.

Alternatively, the target cell could provide a separate RRC container with the appropriate RRC configuration that it wants to preserve, i.e. any change to the RRC parameters outside the indicated appropriate RRC configuration requires negotiation or invalidation of the CHO command.

Example Embodiment 3

In the HO Request Acknowledge, the target cell may also indicate which changes are not allowed at all, i.e. where the source cell shall not even try to request an RRC reconfiguration. Typically, this prohibition is valid within a specific time T, which may be predefined or indicated along with the prohibition. This option is useful when the target cell knows certain resources will be released and available to other UEs (including the potential CHO candidate UE), but only after time T. Thus, prior to timer T expiry, the source cell shall automatically abandon any reconfiguration requiring changes not supported by the target cell during time T.

Example Embodiment 4

The target cell may also define the categorization via conditions and/or parameters. For instance, it may define a resource threshold T_resource for the source cell. Any RRC reconfigurations by the source cell (including changes of the bearer configuration), which keep the resource utilization in the target cell below the threshold T_resource, do not require an explicit agreement of the target cell. If T_resource was exceeded, then the source cell has to agree the RRC reconfiguration with the target cell prior to performing the RRC reconfiguration.

For example, the resource threshold T_resource may be indicated in terms of radio resources, or in terms of throughput/guaranteed bitrate (GBR).

Example Embodiment 5

The source cell has to agree any RRC reconfiguration affecting the bearer definition with the target cell(s), but the source cell has only to inform the candidate target cell(s)

about any other RRC reconfiguration. This option corresponds substantially to a mixture of prior art solutions 2 and 3;

In some example embodiments of the invention, the target cell instructs the source cell which operations are to be performed along with each RRC reconfiguration for a UE with configured CHO. That is, in these example embodiments, the potential RRC reconfigurations may be categorized or may not be categorized. Example operations are as follows:

The source cell has to agree any RRC reconfiguration with the candidate target cell(s) (which practically might deactivate the CHO feature). This option substantially corresponds to prior art solution 2, but now triggered by the target cell;

The source cell has to agree any RRC reconfiguration affecting the bearer definition with the target cell(s), but the source cell has only to inform the candidate target cell(s) about any other RRC reconfiguration. This option corresponds substantially to a mixture of prior art solutions 2 and 3, but now triggered by the target cell;

Any reconfiguration of the RRC context should immediately release the previous CHO command at UE, requiring the source cell to update the request with the updated RRC context. This option corresponds substantially to prior art solution 1, but now triggered by the target cell.

A corresponding signaling indication may be defined for X2AP/XnAP.

Some example embodiments of the invention may also include a mixture of the above embodiments. For example, for a certain (predefined) set of RRC reconfigurations, source cell performs the categorization autonomously, and for the remaining RRC reconfigurations, target cell performs categorizations or defines that a same sequence of operations is to be performed along with all the remaining RRC reconfigurations.

The term "the source cell has to perform operations along with the RRC reconfiguration" (or similar) means that the source cell has to perform some operations before, simultaneously with, and/or after the source cell issues the command for RRC reconfiguration to the UE. Prior art solutions 1 to 4 provide examples of operations to be performed along with the RRC reconfiguration. If some operations are to be performed before the command for the RRC reconfiguration is issued to the UE, it is not required that the command for the RRC reconfiguration is actually issued. For example, if an agreement with one of the target cells is not reached in prior art solution 2, source cell does not issue the command for RRC reconfiguration.

FIG. 7 shows an apparatus according to an embodiment of the invention. The apparatus may be a cell such as a source cell or a corresponding base station, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for monitoring 10, means for checking 20, and means for inhibiting 30. The means for monitoring 10, means for checking 20, and means for inhibiting 30 may be a monitoring means, checking means, and inhibiting means, respectively. The means for monitoring 10, means for checking 20, and means for inhibiting 30 may be a monitor, checker, and inhibitor, respectively. The means for monitoring 10, means for checking 20, and means for inhibiting 30 may be a monitoring processor, checking processor, and inhibiting processor, respectively.

The means for monitoring 10 monitors if a source cell intends performing a radio reconfiguration (e.g. a RRC reconfiguration) of a terminal (S10). The terminal is configured with a conditional handover from the source cell to a target cell.

The means for checking 20 checks if an indication of a predetermined sequence of one or more operations to be performed along with the performing of the radio reconfiguration of the terminal is received from the target cell (S20).

S10 and S20 may be performed in an arbitrary sequence. They may be performed fully or partly in parallel.

If the indication is received from the target cell (S20=yes) and if the radio reconfiguration of the terminal is intended (S10=yes), the means for inhibiting 30 inhibits the performing of the radio reconfiguration of the terminal unless the predetermined sequence of one or more operations is performed along with the performing of the radio reconfiguration (S30). In other words, if the conditions S10 and S20 are fulfilled, the means for inhibiting 30 controls that the predetermined sequence of one or more operations is performed along with the performing of the radio reconfiguration.

FIG. 9 shows an apparatus according to an embodiment of the invention. The apparatus may be a cell such as a source cell or a corresponding base station, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for monitoring 110, means for determining 120, means for deciding 130, and means for inhibiting 140. The means for monitoring 110, means for determining 120, means for deciding 130, and means for inhibiting 140 may be a monitoring means, determining means, deciding means, and inhibiting means, respectively. The means for monitoring 110, means for determining 120, means for deciding 130, and means for inhibiting 140 may be a monitor, determiner, decider, and inhibitor, respectively. The means for monitoring 110, means for determining 120, means for deciding 130, and means for inhibiting 140 may be a monitoring processor, determining processor, deciding processor, and inhibiting processor, respectively.

The means for monitoring 110 monitors if a source cell intends performing a radio reconfiguration (e.g. a RRC reconfiguration) of a terminal (S110). The terminal is configured with a conditional handover from the source cell to a target cell.

The means for determining 120 determines a category ("determined category") to which the radio reconfiguration is associated (S120). The determined category is one among plural predetermined categories.

For each category of at least a subset of the plural predetermined categories, it is defined a respective predetermined sequence of one or more operations. At least one of the following conditions applies:

The respective predetermined sequence of one or more operations of one of the categories of the subset is different from the respective predetermined sequence of one or more operations of another one of the categories of the subset. In this case, all the predetermined categories may belong to the subset.

At least one of the plural predetermined categories does not belong to the subset such that a respective predetermined sequence of one or more operations is not defined for this at least one category.

The means for deciding 130 decides if the determined category is one of the subset, for which a predetermined sequence of one or more operations is defined (S130).

If the determined category is one of the subset (S130=yes) and if the source cell intends performing the radio reconfiguration of the terminal (S110=yes), the means for inhibiting 140 inhibits the performing of the radio reconfiguration of the terminal unless the predetermined sequence of one or more operations of the determined category is performed along with the performing of the radio reconfiguration (S140). In other words, if the conditions S110 and S130 are fulfilled, the means for inhibiting 140 controls that the predetermined sequence of one or more operations is performed along with the performing of the radio reconfiguration.

FIG. 11 shows an apparatus according to an embodiment of the invention. The apparatus may be a cell such as a target cell or a corresponding base station, or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for monitoring 210 and means for indicating 220. The means for monitoring 210 and means for indicating 220 may be a monitoring means and indicating means, respectively. The means for monitoring 210 and means for indicating 220 may be a monitor and indicator, respectively. The means for monitoring 210 and means for indicating 220 may be a monitoring processor and indicating processor, respectively.

The means for monitoring 210 monitors if a target cell receives a conditional handover preparation command for a conditional handover of a terminal from a source cell to the target cell (S210).

If the conditional handover preparation command is received (S210=yes), the means for indicating 220 indicates, to the source cell, a predetermined sequence of one or more operations to be performed along with performing a potential radio reconfiguration of the terminal (S220).

FIG. 13 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 8, 10, and 12.

Embodiments of the invention are described for 5G networks. However, the invention is not restricted to 5G networks and may be employed in other 3GPP networks such as 3G networks, 4G networks, and upcoming 3GPP releases, too. The invention may be employed in non-3GPP networks provided they comprise a function corresponding to a conditional handover.

A UE is an example of a terminal. Other examples of terminals are e.g. a MTC device. The terminal is selected according to the respective network.

A cell may be represented by its base station, e.g. eNB or gNB. If not otherwise indicated or made clear from the context, the terms "cell" and "base station" are used synonymously in the present application.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a cell or a base station embodying the cell, such as a gNB or eNB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and at least one memory including computer program code, the at least one memory and computer program code being configured, with the at least one processor, to cause the apparatus to:
monitor when a target cell receives a conditional handover preparation command for a conditional handover of a terminal from a source cell to the target cell;
indicate, to the source cell, a predetermined sequence of one or more operations to be performed along with performing a potential radio reconfiguration of the terminal when the conditional handover preparation command is received; and
provide a set of one or more associations to the source cell when the conditional handover preparation command is received,
wherein each of the associations associates one or more potential radio reconfigurations of the terminal to a respective category among plural predetermined categories,
wherein at least a subset of the categories is associated to a respective predetermined sequence of one or more operations to be performed along with performing one of the radio reconfigurations of the respective category, wherein the predetermined sequence of one or more operations includes:

getting agreement from the target cell for the respective radio reconfiguration;

informing the target cell on the respective radio reconfiguration; and releasing a conditional handover configuration of the terminal from the source cell to the target cell prior to performing the respective radio reconfiguration, wherein the respective predetermined sequence associated with one of the categories of the subset is different from the respective predetermined sequence of another one of the categories of the subset, and wherein at least one of the plural predetermined categories does not belong to the subset such that a respective predetermined sequence of one or more operations is not defined for this at least one category, wherein any change to the respective radio reconfiguration outside an indicated appropriate radio reconfiguration configuration requires negotiation or invalidation of the conditional handover preparation command.

* * * * *